United States Patent
Leon et al.

(10) Patent No.: US 11,015,732 B2
(45) Date of Patent: May 25, 2021

(54) AXIALLY RESTRICTED PRESSURE SHUTTLE

(71) Applicant: GE Oil & Gas Pressure Control LP, Houston, TX (US)

(72) Inventors: Claudia Leon, Houston, TX (US); Gajanan Hegde, Houston, TX (US); Keith Adams, Katy, TX (US); Travis McEvoy, Houston, TX (US)

(73) Assignee: GE Oil & Gas Pressure Control LP, Houston, TX (US)

( * ) Notice: Subject to any disclaimer, the term of this patent is extended or adjusted under 35 U.S.C. 154(b) by 0 days.

(21) Appl. No.: 16/280,203

(22) Filed: Feb. 20, 2019

(65) Prior Publication Data

US 2019/0178412 A1    Jun. 13, 2019

Related U.S. Application Data

(63) Continuation-in-part of application No. 16/158,490, filed on Oct. 12, 2018, which is a continuation of
(Continued)

(51) Int. Cl.
*F16K 27/02* (2006.01)
*E21B 34/08* (2006.01)
(Continued)

(52) U.S. Cl.
CPC ........ *F16K 31/1228* (2013.01); *E21B 17/085* (2013.01); *E21B 34/02* (2013.01);
(Continued)

(58) Field of Classification Search
CPC .......... F16B 7/20; F16B 21/04; F16K 15/025; F16K 15/026; F16K 15/063; F16K 17/04;
(Continued)

(56) References Cited

U.S. PATENT DOCUMENTS 2,610,820 A    9/1952   Markel
2,935,166 A    9/1960   Carlson, Jr.
(Continued)

FOREIGN PATENT DOCUMENTS

CN         2121592       11/1992
CN       101093034       12/2007
(Continued)

OTHER PUBLICATIONS

PCT International Preliminary Report on Patentability issued in connection with corresponding PCT Application No. PCT/US2016/036328 dated Dec. 21, 2017.

(Continued)

*Primary Examiner* — Matthew W Jellett
(74) *Attorney, Agent, or Firm* — Hogan Lovells US LLP

(57) ABSTRACT

Embodiments of the present disclosure include a system for coupling objects in a wellbore includes a unidirectional valve having a body. The body includes two or more body lugs extending radially outward, each body lug of the two or more body lugs extending at least a portion of a circumferential distance of the body. The system also includes a tubing hanger having a bore that receives the unidirectional valve. The bore includes an axial restraint system that receives the two or more body lugs and blocks axial movement of the unidirectional valve in a first position and enables axial movement of the unidirectional valve in a section position, the unidirectional valve being non-threadingly coupled to the tubing hanger.

19 Claims, 9 Drawing Sheets

Related U.S. Application Data application No. 15/175,122, filed on Jun. 7, 2016, now Pat. No. 10,132,422, which is a continuation-in-part of application No. 14/949,324, filed on Nov. 23, 2015, now Pat. No. 9,759,240, which is a continuation-in-part of application No. 13/832,884, filed on Mar. 15, 2013, now Pat. No. 9,212,758.

(60) Provisional application No. 62/172,544, filed on Jun. 8, 2015, provisional application No. 61/747,479, filed on Dec. 31, 2012.

(51) Int. Cl.
| | |
|---|---|
| *F16B 21/04* | (2006.01) |
| *F16K 31/122* | (2006.01) |
| *F16K 27/00* | (2006.01) |
| *F16K 37/00* | (2006.01) |
| *F16K 15/06* | (2006.01) |
| *E21B 17/08* | (2006.01) |
| *F16B 7/20* | (2006.01) |
| *E21B 34/02* | (2006.01) |
| *F16K 35/08* | (2006.01) |
| *F16K 31/126* | (2006.01) |
| *F16K 35/06* | (2006.01) |

(52) U.S. Cl.
CPC ............. *E21B 34/08* (2013.01); *F16B 7/20* (2013.01); *F16B 21/04* (2013.01); *F16K 15/063* (2013.01); *F16K 27/00* (2013.01); *F16K 27/0209* (2013.01); *F16K 31/1221* (2013.01); *F16K 37/0008* (2013.01); *E21B 2200/04* (2020.05); *E21B 2200/06* (2020.05); *F16K 31/1262* (2013.01); *F16K 35/06* (2013.01); *F16K 35/08* (2013.01); *Y10T 137/6065* (2015.04)

(58) Field of Classification Search
CPC .......... F16K 27/0209; Y10T 137/7929; Y10T 137/7932; Y10T 137/7933; Y10T 137/7934; E21B 17/085; E21B 34/02; E21B 34/08; E21B 2034/002; E21B 2034/007
USPC ........................................................ 166/97.1
See application file for complete search history.

(56) References Cited

U.S. PATENT DOCUMENTS

| | | | |
|---|---|---|---|
| 3,082,792 A | 3/1963 | Jenkins | |
| 3,115,068 A | 12/1963 | Lofink | |
| 3,139,898 A | 7/1964 | Wiltgen | |
| 3,146,682 A | 9/1964 | Price et al. | |
| 3,175,473 A | 3/1965 | Boteler et al. | |
| 3,293,992 A | 12/1966 | Baumann | |
| 3,380,470 A | 4/1968 | Culpepper, Jr. et al. | |
| 3,593,959 A | 7/1971 | Greene | |
| 3,792,717 A | 2/1974 | Tibbals | |
| 3,811,457 A | 5/1974 | Crossman | |
| 3,882,400 A | 5/1975 | Lewis | |
| 3,955,793 A | 5/1976 | Burkhardt et al. | |
| 3,958,592 A | 5/1976 | Wells | |
| 3,993,284 A | 11/1976 | Lukens, Jr. | |
| 4,135,546 A | 1/1979 | Morrison | |
| 4,135,547 A | 1/1979 | Akkerman | |
| 4,187,764 A | 2/1980 | Cho | |
| 4,274,432 A | 6/1981 | Tunstall et al. | |
| 4,309,022 A | 1/1982 | Reinicket et al. | |
| 4,354,425 A | 10/1982 | Bruton et al. | |
| 4,424,738 A | 1/1984 | Leighton | |
| 4,480,811 A | 11/1984 | Card et al. | |
| 4,489,756 A | 12/1984 | Balz | |
| 4,491,060 A | 1/1985 | Boski | |
| 4,527,769 A | 7/1985 | Stogner et al. | |
| 4,529,330 A | 7/1985 | Boski | |
| 4,585,207 A | 4/1986 | Shelton | |
| 4,620,562 A | 11/1986 | Pacht | |
| 4,624,442 A | 11/1986 | Duffy et al. | |
| 4,633,898 A | 1/1987 | Denk | |
| 4,650,151 A | 3/1987 | McIntyre | |
| 4,721,284 A | 1/1988 | Bankard | |
| 4,768,545 A | 9/1988 | Hoffman | |
| 4,871,143 A | 10/1989 | Baker | |
| 4,934,403 A | 6/1990 | Mooney et al. | |
| 4,967,785 A | 11/1990 | Young | |
| 5,067,392 A | 11/1991 | Gautier | |
| 5,294,090 A | 3/1994 | Winnike | |
| 5,464,040 A | 11/1995 | Johnson | |
| 5,499,648 A | 3/1996 | Powell et al. | |
| 5,964,446 A | 10/1999 | Walton et al. | |
| 6,015,134 A | 1/2000 | Johnson | |
| 6,041,804 A | 3/2000 | Chatufale | |
| 6,050,541 A | 4/2000 | Chatufale | |
| 6,086,039 A | 7/2000 | Sievers et al. | |
| 6,089,531 A | 7/2000 | Young | |
| 6,397,892 B1 | 6/2002 | Pyle et al. | |
| 6,487,960 B1 | 12/2002 | Chatufale | |
| 6,659,419 B2 | 12/2003 | Chatufale | |
| 6,672,331 B2 | 1/2004 | Heald | |
| 6,684,897 B2 | 2/2004 | Sundararajan | |
| 6,695,049 B2 * | 2/2004 | Ostocke ................. E21B 34/02 166/97.1 |
| 6,854,704 B1 | 2/2005 | Young | |
| 7,124,774 B2 | 10/2006 | Weingarten | |
| 7,159,839 B2 | 1/2007 | Tanikawa et al. | |
| 7,647,861 B2 | 1/2010 | Bessman | |
| 7,708,089 B2 * | 5/2010 | Williams ................ E21B 47/12 166/84.3 |
| 8,141,642 B2 * | 3/2012 | Olstad .................... E21B 19/16 166/319 |
| 8,282,070 B2 | 10/2012 | Davies, Jr. | |
| 8,322,359 B2 | 12/2012 | Zecchi et al. | |
| 8,522,877 B2 | 9/2013 | Chambers et al. | |
| 8,636,058 B2 * | 1/2014 | Nguyen ................. E21B 23/01 166/97.1 |
| 8,708,309 B2 | 4/2014 | Roper et al. | |
| 8,864,102 B2 | 10/2014 | Gamache | |
| 8,910,658 B2 | 12/2014 | Adams et al. | |
| 8,991,420 B2 | 3/2015 | Adams et al. | |
| 8,998,166 B2 | 4/2015 | Adams et al. | |
| 9,033,308 B2 | 5/2015 | Kiesbauer et al. | |
| 9,212,758 B2 | 12/2015 | Adams et al. | |
| 9,422,788 B2 | 8/2016 | Nguyen et al. | |
| 9,568,117 B2 | 2/2017 | Adams et al. | |
| 9,759,240 B2 | 9/2017 | McEvoy et al. | |
| 2002/0175303 A1 | 11/2002 | Chatufale | |
| 2003/0034465 A1 | 2/2003 | Adams et al. | |
| 2004/0007682 A1 | 8/2004 | Engle et al. | |
| 2005/0087712 A1 | 4/2005 | Lymberopoulos | |
| 2007/0290154 A1 | 12/2007 | Aoyama | |
| 2011/0240126 A1 | 10/2011 | Lymberopoulos et al. | |
| 2012/0227983 A1 | 9/2012 | Lymberopoulos et al. | |
| 2012/0318388 A1 | 12/2012 | Du | |
| 2014/0034392 A1 * | 2/2014 | Ganzinotti, II ........... E21B 7/20 175/57 |
| 2014/0138564 A1 | 5/2014 | Adams et al. | |
| 2014/0174554 A1 | 6/2014 | Meyberg et al. | |
| 2015/0204456 A1 | 7/2015 | Adams et al. | |
| 2016/0186527 A1 | 6/2016 | Cocker, III | |
| 2016/0327179 A1 | 11/2016 | Luciotti et al. | |

FOREIGN PATENT DOCUMENTS

| | | |
|---|---|---|
| CN | 202302237 | 7/2012 |
| CN | 202432085 | 9/2012 |
| CN | 205806614 | 12/2016 |
| DE | 102011015646 | 10/2012 |
| EP | 0416966 | 3/1991 |
| EP | 0486824 | 5/1992 |
| FR | 1195213 | 11/1959 |

(56) References Cited

FOREIGN PATENT DOCUMENTS

| GB | 1148817 | 4/1969 |
|---|---|---|
| GB | 2022704 | 12/1979 |
| GB | 2168787 | 6/1986 |
| GB | 2303199 | 2/1997 |
| JP | 2008069795 | 3/2008 |
| JP | 2010048271 | 3/2010 |
| WO | 2014099505 | 6/2014 |

OTHER PUBLICATIONS

Actuators Pressure Control CHA Top Access Standard Hydraulic Actuator, GE Oil & Gas, 2013.
International Search Report and Written Opinion issued in connection with related PCT Application No. PCT/US2013/067666, dated Mar. 3, 2014.
International Search Report and Written Opinion issued in connection with related PCT Application No. PCT/US13/077392, dated Mar. 7, 2014.
Non-Final Rejection towards related U.S. Appl. No. 13/679,553 dated Mar. 28, 2014.
International Search Report and Written Opinion issued in connection with related PCT Application No. PCT/US2013/074223 dated Apr. 3, 2014.
Non-Final Rejection towards related U.S. Appl. No. 13/717,073 dated Jul. 31, 2014.
Non-Final Rejection towards related U.S. Appl. No. 14/107,589 dated Aug. 13, 2014.
Final Rejection towards related U.S. Appl. No. 13/679,553 dated Oct. 17, 2014.
Notice of Allowance issued in connection with related U.S. Appl. No. 13/679,553 dated Nov. 21, 2014.
Non-Final Rejection towards related U.S. Appl. No. 14/673,178 dated Jul. 30, 2015.
International Search Report and Written Opinion issued in connection with related PCT Application No. PCT/US2015/49556, dated Nov. 19, 2015.
Actuators NoBolt Dual Seal Pneumatic Actuator, GE Oil & Gas, 2015.
Office Action issued in connection with related CN Application No. 201380070284.5 dated May 25, 2016.
Office Action issued in connection with related CN Application No. 201380074076.2 dated Jun. 30, 2016.
Office Action issued in connection with related CN Application No. 201380070678.0 dated Jul. 5, 2016.
Non-Final Rejection towards related U.S. Appl. No. 14/673,178 dated Jul. 15, 2016.
PCT Search Report and Written Opinion for related application PCT/US2013/077412 dated Mar. 7, 2014.
U.S. Appl. No. 62/172,544, filed Jun. 8, 2015.
"Xmas tree installation," Wipertrip.com Drilling and Well Engineering Resources, http://wipertrip.com/completion/operations/80-xmas-tree-installation.html, 5 pages.

* cited by examiner

AXIALLY RESTRICTED PRESSURE SHUTTLE

CROSS REFERENCE TO RELATED APPLICATIONS

This application is a continuation-in-part of co-pending U.S. patent application Ser. No. 16/158,490 filed Oct. 12, 2018 titled "COMPOUND EXPRESS ACTUATOR CONNECTION," which is a continuation of U.S. patent application Ser. No. 15/175,122, now U.S. Pat. No. 10,132,422, filed Jun. 7, 2016 titled "COMPOUND EXPRESS ACTUATOR CONNECTION," which claims priority to U.S. Provisional Application No. 62/172,544 filed Jun. 8, 2015 titled "Compound Express Actuator Connection," and which is a continuation-in-part of U.S. patent application Ser. No. 14/949,324, now U.S. Pat. No. 9,759,240, filed Nov. 23, 2015 titled "No-Bolt Security Latching System," which is a continuation in part of U.S. application Ser. No. 13/832,884, now U.S. Pat. No. 9,212,758, titled "Quick Connect Valve Actuator," filed Mar. 15, 2013, which claims priority to U.S. Provisional Patent Application No. 61/747,479, titled "Quick Connect Valve Actuator," filed on Dec. 31, 2012, the disclosure of each which is incorporated herein by reference in its entirety.

BACKGROUND

1. Field of Invention

This disclosure relates in general to oil and gas tools, and in particular, to systems and methods for installation of isolation components in a wellbore.

2. Description of the Prior Art

In oil and gas production, various pressure control systems may be installed within a well to regulate production, testing, stimulation, drilling, completion, and the like. For example, various valves, packing, and other materials may be used to isolate portions of the wellbore. In operation, a back pressure valve may be threaded into one or more components, such as hangers. The back pressure valve allows flow in a first direction and blocks flow in a second direction, for example, in response to pressure. Threaded connections typically involve multiple rotations to secure the components together and run the risk of cross-threading, thereby providing a potential leak path. Moreover, threads may be damaged during trips into the wellbore and, moreover, may be sized to engage with certain mating threads. As a result, if the downhole threads do not match with the isolation equipment then there is potential for rig downtime and other problems. Additionally, threaded connections may take long periods of time to install, and moreover, do not provide indications of pressure below the connection.

SUMMARY

Applicants recognized the problems noted above herein and conceived and developed embodiments of systems and methods, according to the present disclosure, for wellbore pressure isolation.

In an embodiment a wellbore pressure control system includes a tubing hanger having a bore extending from a first end to a second end. The tubing hanger includes a hanger lug extending radially inward from a wall of the bore toward an axis. The tubing hanger also includes a shoulder axially lower than the hanger lug, the shoulder extending radially inward from the wall of the board toward the axis. The tubing hanger further includes an opening between the hanger lug and the shoulder. The system also includes a unidirectional valve arranged within the bore of the tubing hanger. The unidirectional valve includes a valve assembly blocking flow in a first direction and enabling flow in a second direction. The unidirectional valve also includes a body lug extending radially outward from a body of the unidirectional valve, the body lug positioned within the opening such that the body lug is axially aligned with the hanger lug to restrict axial movement of the unidirectional valve relative to the tubing hanger.

In another embodiment a system for coupling objects in a wellbore includes a unidirectional valve having a body. The body includes two or more body lugs extending radially outward, each body lug of the two or more body lugs extending at least a portion of a circumferential distance of the body. The system also includes a tubing hanger having a bore that receives the unidirectional valve. The bore includes an axial restraint system that receives the two or more body lugs and blocks axial movement of the unidirectional valve in a first position and enables axial movement of the unidirectional valve in a section position, the unidirectional valve being non-threadingly coupled to the tubing hanger.

In an embodiment a method for installing a valve into a tubing hanger includes aligning the valve with a bore of the tubing hanger. The method also includes axially moving the valve through the bore. The method further includes landing at least a portion of the valve on a shoulder extending radially inward from the bore. The method also includes rotating the valve less than one full rotation.

BRIEF DESCRIPTION OF THE DRAWINGS

The present technology will be better understood on reading the following detailed description of non-limiting embodiments thereof, and on examining the accompanying drawings, in which.

DETAILED DESCRIPTION OF THE INVENTION

Figure 1:
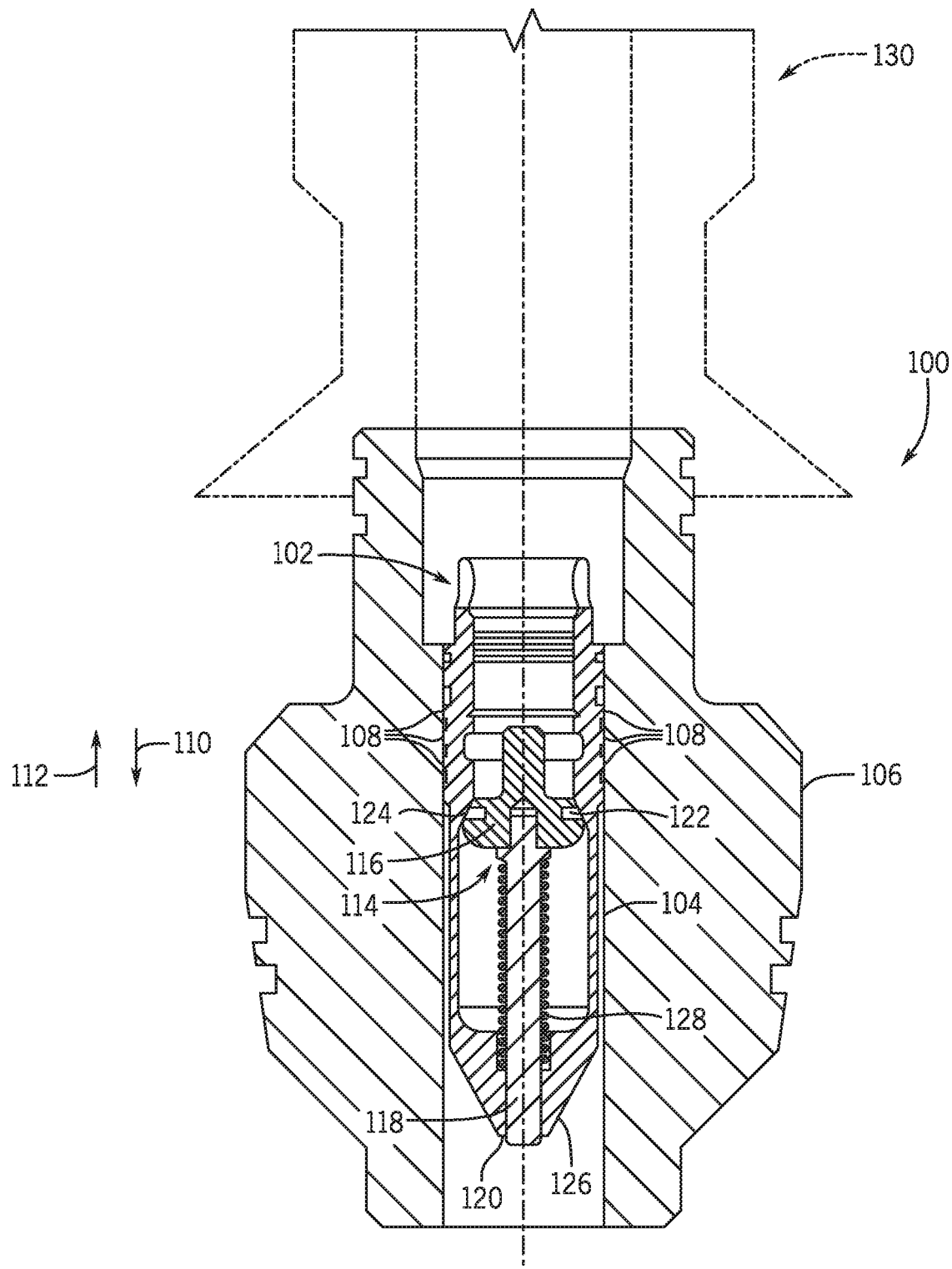
FIG. 1 is a schematic cross-sectional view of an embodiment of a unidirectional valve arranged within a hanger, in accordance with embodiments of the present disclosure.

The foregoing aspects, features and advantages of the present technology will be further appreciated when considered with reference to the following description of preferred embodiments and accompanying drawings, wherein like reference numerals represent like elements. In describing the preferred embodiments of the technology illustrated in the appended drawings, specific terminology will be used for the sake of clarity. The present technology, however, is not intended to be limited to the specific terms used, and it is to be understood that each specific term includes equivalents that operate in a similar manner to accomplish a similar purpose.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "an embodiment", "certain embodiments," or "other embodiments" of the present invention are not intended to be interpreted as excluding the existence of additional embodiments that also incorporate the recited features. Furthermore, reference to terms such as "above," "below," "upper", "lower", "side", "front," "back," or other terms regarding orientation are made with reference to the illustrated embodiments and are not intended to be limiting or exclude other orientations.

Embodiments of the present disclosure are directed toward an axially restricted pressure shuttle, which may include a valve installed in a downhole component, such as a hanger. In various embodiments, the valve is non-threadingly coupled to the component, for example, utilizing radial lugs that interact with radial lugs of the downhole components to block axial movement of the valve after the valve is positioned in a locked position. For example, in various embodiments, the valve includes outwardly extending radial lugs that pass through gaps between inwardly extending radial lugs of the hanger as the valve is moved axially through the hanger. Once past the lugs of the hanger, the valve may be rotated to align the respective lugs with one another. Accordingly, axial movement of the valve is restricted due to the axial alignment of the respective lugs.

Embodiments of the present disclosure may be easier or faster to install than threaded methods in that fewer rotations are utilized to align the lugs than to engage mating threads. For example, the valve may be installed using less than a full rotation of the valve due to the removal of the frictional coupling (e.g., threads) in favor of the lug arrangement. Furthermore, the valve may also be easier to remove, and be removable with less force, since threads will not be disengaged. In various embodiments, systems of the present disclosure are also easier to manufacture because tolerances may not be as close as for threaded components. Moreover, components may be smaller (e.g., shorter) due to the removal of the threads. Additionally, in embodiments, a feedback mechanism may be provided utilizing embodiments of the present disclosure. For example, if an operator had difficulty rotating or removing the valve, it may be attributed to an upward force on the valve, which would drive the lugs against one another. As such, removal may be delayed until the pressure is contained.

FIG. 1 is a schematic side view of an embodiment of a pressure control system 100 including a unidirectional valve 102 (e.g., back pressure valve (BPV), check valve, one-way valve, etc.) positioned within a bore 104 of a tubing hanger 106. In certain embodiments, the unidirectional valve 102 includes threads 108 to facilitate coupling to the tubing hanger 106. For instance, the tubing hanger 106 may include corresponding threads for installation of the unidirectional valve 102. It should be appreciated that, in various embodiments, the tubing hanger 106 may also be a casing hanger and/or a portion of a wellhead. In operation, the unidirectional valve 102 allows flow into a wellbore in a single direction and blocks flow in the opposite direction. For example, the illustrated unidirectional valve 102 enables flow in a downstream direction 110 and blocks flow in an upstream direction 112. As used here, the downstream direction 110 is the direction of flow into the wellbore and the upstream direction 112 is the direction of flow out of the wellbore.

The illustrated unidirectional valve 102 has a valve assembly 114 that may include a flange 116 and an elongate member 118 that extends from the flange 116 to or near a bottom end 120 of the unidirectional valve 102. The flange 116 may have a seal 122 that blocks fluid from passing between the flange 116 and a shoulder 124 on a body 126 of the unidirectional valve 102. In the illustrated embodiment, a spring 128 surrounds at least a portion of the elongate member 118 to help control the movement of the valve assembly 114. In operation, as fluid flows in the downstream direction 110, the spring 128 is compressed and the flange 116 is driven away from the shoulder 124 to enable fluid flow past the elongate member 118 and through the bore 104. The spring 128 is biased so that absent the external force, for example from a fluid flow, the flange 116 is driven against the shoulder 124. It should be appreciated that while the illustrated unidirectional valve 102 includes the valve assembly 114, in other embodiments the unidirectional valve 102 may be a ball check valve, a spring check valve, diaphragm check valve, a swing check valve, a stop check valve, a lift check valve, or any other reasonable device that enables flow in a direction and blocks flow in an opposite direction.

As noted above, in various embodiments the unidirectional valve 102 is threaded into the hanger 106. Accordingly, engagement between the unidirectional valve 102 and the hanger 106 may be accomplished by aligning the unidirectional valve 102 and the hanger 106 and then rotating the unidirectional valve 102 a certain number of times until a sufficient number of threads are engaged, thereby forming a coupling between the unidirectional valve 102 and the hanger 106 to restrict axial movement (e.g., along a wellbore axis 132) of the unidirectional valve 102. This may be referred to as a friction coupling because friction between mating threads blocks axial movement of the valve relative to the hanger. However, in various embodiments, the threads of either the unidirectional valve 102 or the hanger 106 may be damaged, for example, due to tripping of components into and out of the well. Furthermore, in embodiments, the threads for each of the components may be different sizes (e.g., pitch, units, etc.) and therefore, various components at the well site may not correspond with other another.

Embodiments of the present disclosure describe a unidirectional valve that may be installed without threaded fittings, therefore reducing or eliminating drawbacks found in present technologies. Moreover, in embodiments, the unidirectional valve may be coupled to the hanger utilizing fewer rotations of the unidirectional valve, for example, less than one full rotation, thereby reducing installation time. Furthermore, as will be described, in various embodiments one or more features may be utilized to guide the unidirectional valve into position.

Figure 2:
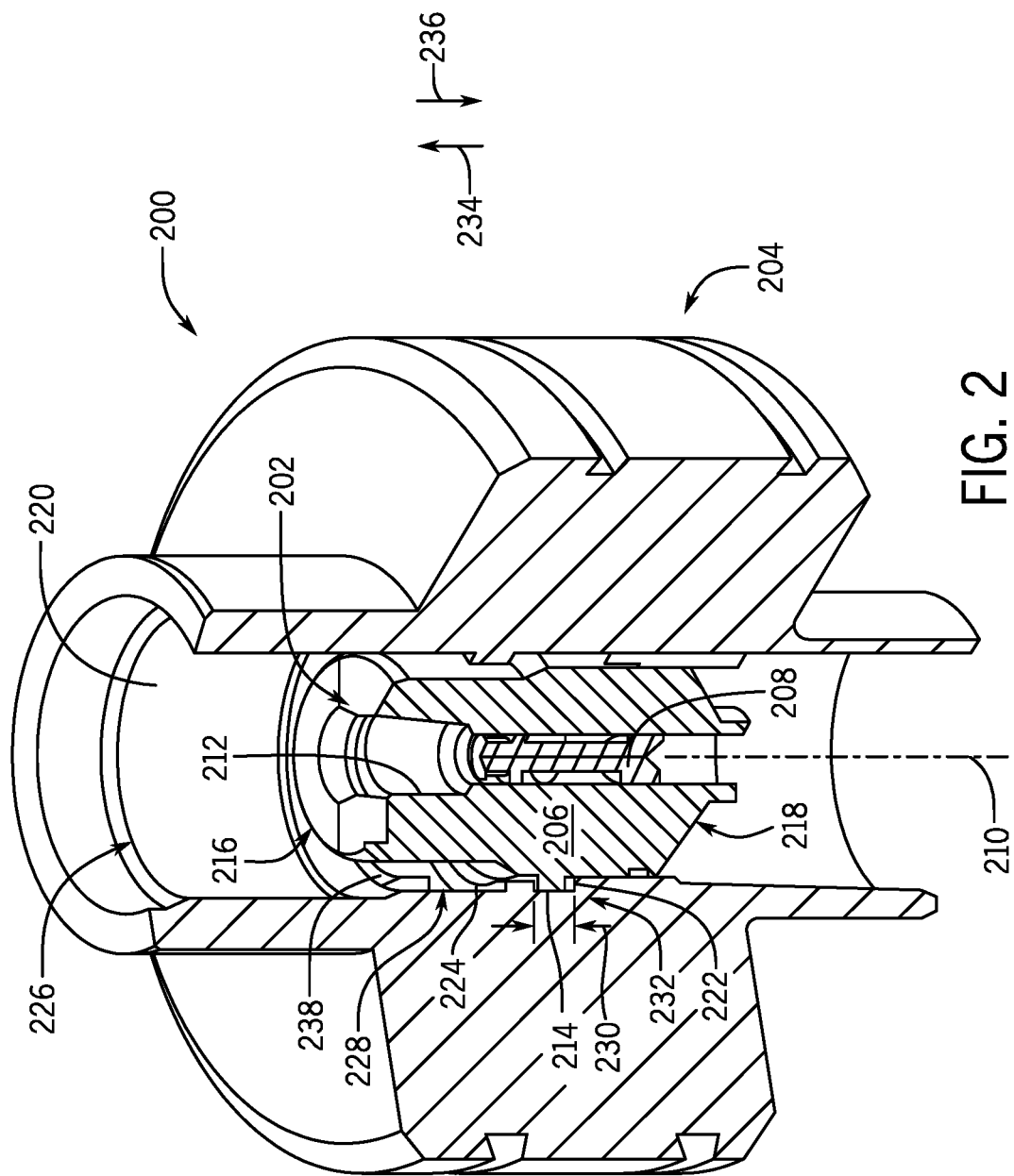
FIG. 2 is an isometric sectional view of an embodiment of a unidirectional valve arranged within a hanger, in accordance with embodiments of the present disclosure.

FIG. 2 is an isometric sectional view of an embodiment of a unidirectional valve 200 arranged within a hanger 204. The illustrated unidirectional valve 202 includes a body 206 including a valve assembly 208, similar to the poppet valve 24 illustrated in FIG. 1. The valve assembly 208 moves axially along an axis 210 in response to pressure. In various embodiments, the valve assembly 208 may be biased toward a certain position, such as an open position, which would enable flow through a valve bore 212, and a closed position, which would block flow through the valve bore 214. The position may be changed based on pressure exerted by a working fluid. For example, the valve assembly 208 may be arranged in a closed position until acted upon by a force from an upstream portion of the valve, which would be a fluid flowing into the wellbore in operation.

The illustrated body 206 includes body lugs 214, which may also be referred to as segmented radial beams, extending radially outward from the axis 210. In various embodiments, the body lugs 214 are arranged circumferentially about a circumference 218 of the body 206, with spaces between, as will be described herein. The body lugs 216 may be utilized to restrict axial movement of the valve 202.

The illustrated valve 202 further includes a slanted lower edge 218, which may be utilized to guide the valve 202 into position. For example, the slanted lower edge 218 may engage one or more features of the hanger 204 to facilitate alignment of the valve 202 with a hanger bore 220. Because the illustrated valve 202 is not coupled to threads of the hanger 204, damage to sealing or other engagement surfaces may be reduced.

Turning to the hanger 204, the illustrated hanger includes a shoulder 222 and a hanger lug 224. It should be appreciated that, in various embodiments, the shoulder 222 may extend circumferentially about a circumference 226 of the hanger bore 220, while the hanger lug 224 may correspond to a plurality of hanger lugs 224 arranged circumferentially about the circumference 226 with gaps or spaces 228 between hanger lugs 224. In various embodiments, the gaps 228 may be larger than or equal to a width of the body lugs 214, thereby facilitating axial movement of the valve 202 when the body lugs 214 and the gaps 228 are aligned. In the illustrated embodiment, each of the shoulder 222 and the hanger lugs 224 extend radially inward toward the axis 210. In various embodiments, the shoulder 222 and the hanger lugs 224 extend the same distance toward the axis 210. However, in other embodiments, the shoulder 222 or the hanger lugs 224 may extend further inward.

In the illustrated embodiment, the hanger lugs 224 are axially offset from the shoulder 222 by a distance 230. In other words, the hanger lugs 224 offset from the shoulder 222 by the distance 230 such that, in the embodiment illustrated in FIG. 2, the hanger lugs 224 are above or closer to a top of the hanger 204 than the shoulder 222. An opening 232 spans the distance 230 to receive the body lugs 214. As a result, axial movement of the valve 202 is blocked when the lugs are axially aligned. For example, upward movement 234 is blocked by the hanger lug 224 and downward movement 236 is blocked by the shoulder 222. Accordingly, the valve 202 may be secured to the hanger 204 without the use of screws or other friction coupling devices.

As illustrated in FIG. 2, the hanger lugs 224 include an angled surface 238 at an upper end of the hanger lugs 224. In embodiments, the slanted lower edge 218 may contact the angled surface 230 to facilitate alignment of the valve 202 with the hanger bore 220. Accordingly, the body lugs 214 may be aligned with the gaps 228 to facilitate coupling the valve 202 to the body 204.

Figure 3:
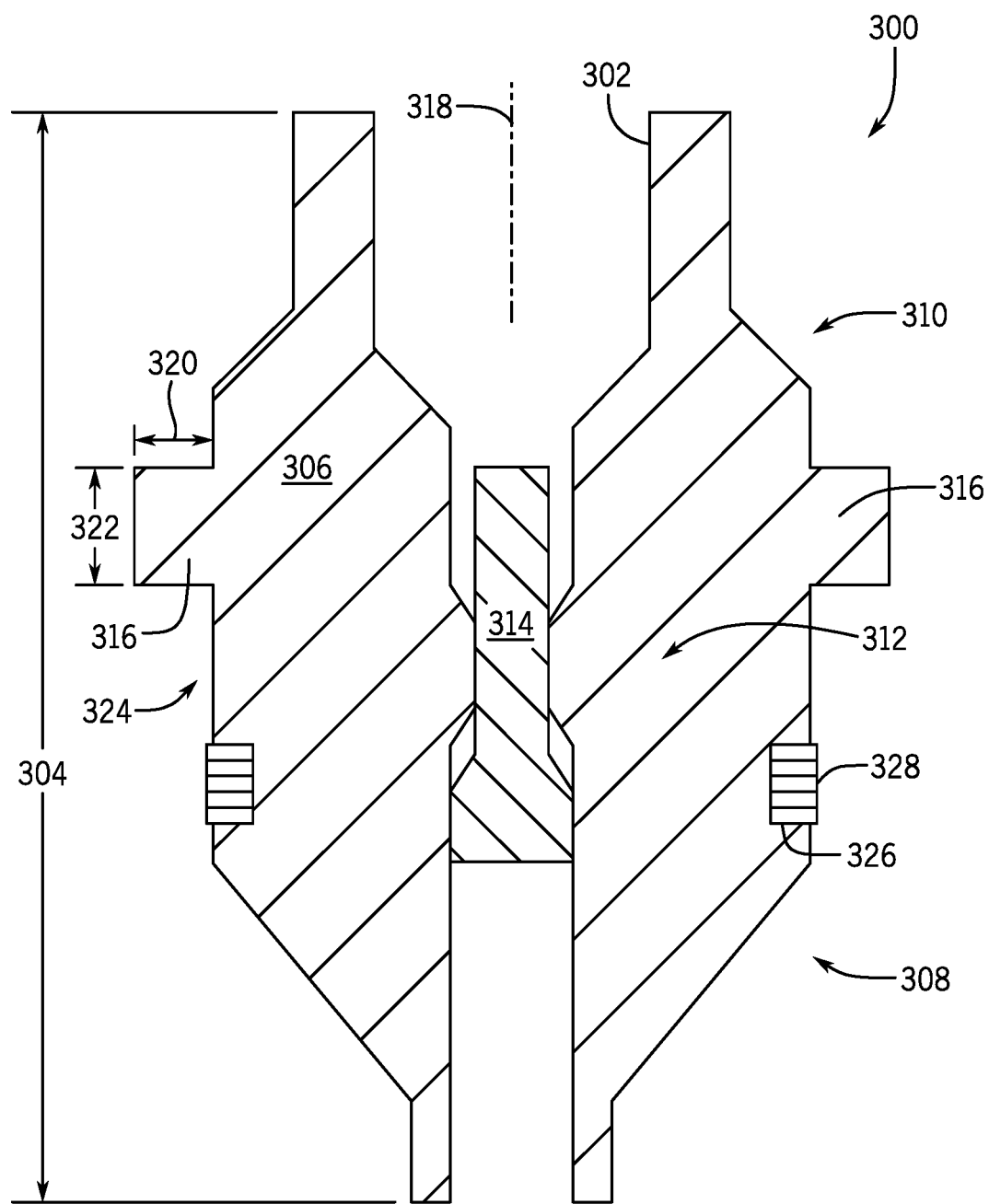
FIG. 3 is a schematic cross-sectional view of an embodiment of a unidirectional valve having body lugs, in accordance with embodiments of the present disclosure.

FIG. 3 is a cross-sectional view of an embodiment of a unidirectional valve 300 that includes a bore 302 extending along a length 304 of the valve 300. The valve 300 is formed by a body 306, which may be a metallic material, and is illustrated as a continuous, integral piece in the illustrated embodiment. However, it should be appreciated that the body 306 may be formed from multiple different components that are coupled together, and in various embodiments, the components may be formed by different materials. For example, a lower end 308 may be formed from a material that is suitable for sour or corrosive service while an upper end 310 may be formed from a different material, which may reduce costs associated with the valve 300. Additionally, in various embodiments, the valve 300 may include coatings, liners, and the like.

As described above, the bore 302 includes a reduced diameter portion 312 through which a valve assembly 314 extends. It should be appreciated that certain features, such as a resilient or biasing member associated with the valve assembly 314, are removed for clarity. Furthermore, the illustrated body 306 includes body lugs 316 extending radially outward from an axis 318 of the valve 300. That is, the body lugs 316 extend away from the body 306 with respect to the axis 318. In the illustrated embodiment, the body lugs 316 include a length 320 and a height 322. The length 320 refers to the radial extent of the body lugs 316, for example beyond a circumference 324 of the body 306. The height 322 refers to an axial extent of the body lugs 316. As described herein, the lugs 316 may not be formed from a continuous, extending piece about the circumference 324, and rather, are discrete sections having a width and spaces between the body lugs 316. It should be appreciated that any number of body lugs 316 may be included and that the number of body lugs 316 included may vary based on expected wellbore conditions.

The illustrated valve 300 further includes a circumferential groove 326 that receives a seal 328. In various embodiments, the seal 328 may be compressed via engagement with the wellhead and/or hanger, thereby providing at least one fluid barrier. While the illustrated embodiment includes a single seal 328, it should be appreciated that multiple grooves 326 and seals 328 may be included. As shown, the groove 326 and seal 328 are arranged axially lower or downstream (e.g., relative to a direction of fluid flowing into the wellbore) of the body lugs 316. Accordingly, during installation, the seal 328 may be set when the value 300 is put into position, for example, when the body lugs 316 are arranged within an opening of the hanger, as described above.

Figure 4:
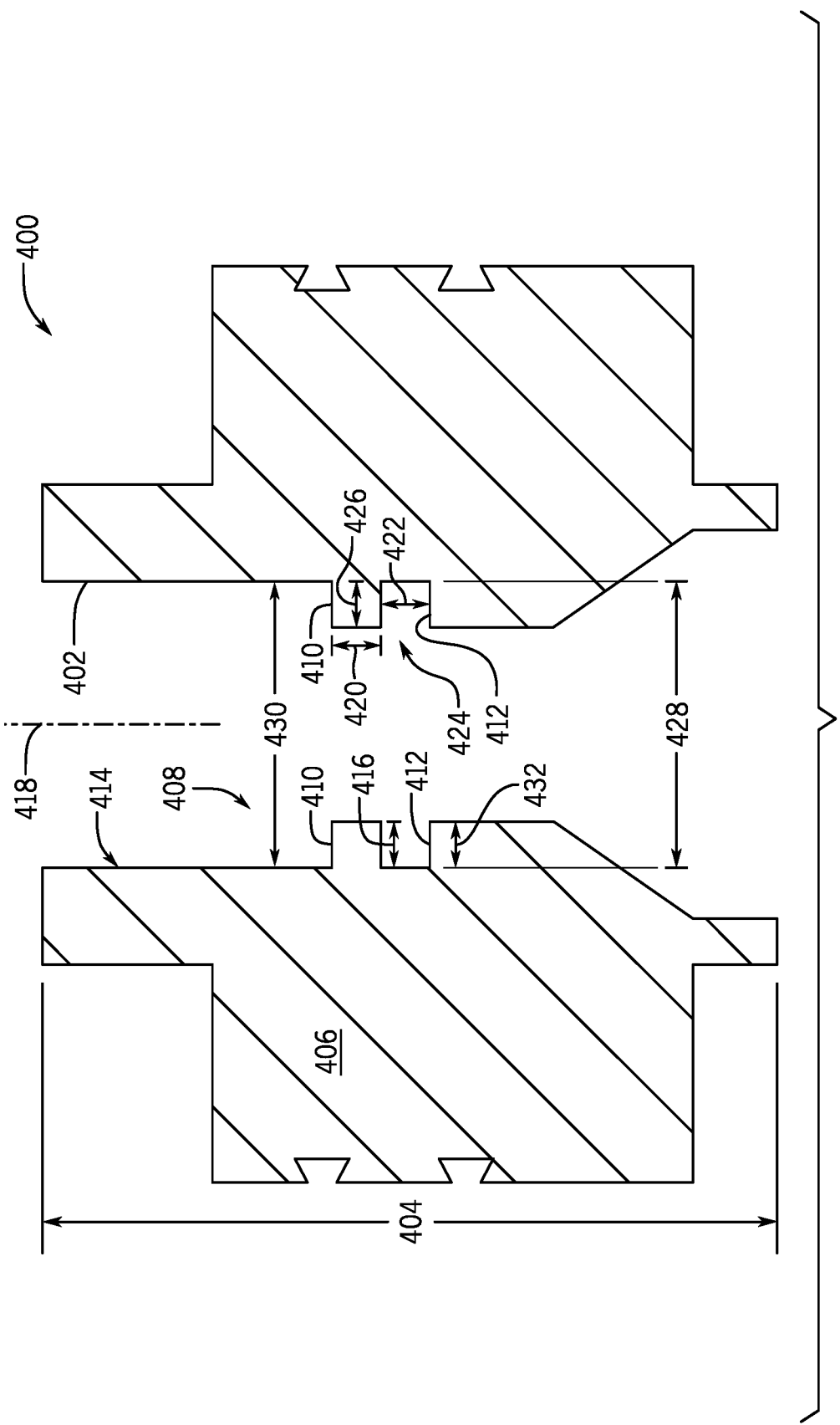
FIG. 4 is a schematic cross-sectional view of an embodiment of a tubing hanger having hanger lugs, in accordance with embodiments of the present disclosure.

FIG. 4 is a cross-sectional view of an embodiment of a tubing hanger 400. The illustrated tubing hanger 400 includes a bore 402 extending along a length 404 of the tubing hanger 400. The tubing hanger 400 further includes a body 406, which may be metallic. In various embodiments, the tubing hanger 400 includes an axial restraint system 408, which includes a hanger lug 410 and a shoulder 412. It should be appreciated that, in various embodiments, the hanger lug 410 may not extend circumferentially about a circumference 414 of the bore 402, but rather, may be formed by a plurality of hanger lugs 410 extending a certain circumferential distance about the bore 402. For example, there may be a series of hanger lugs 410 that are separated by gaps to facilitate axial passage of the body lugs 316 (FIG. 3). As will be described, axial passage of the body lugs 316 positions the body lugs 316 into an opening in the hanger. The illustrated hanger lugs 410 extend a length 416 radially inward toward an axis 418 and further include a height 420.

In the illustrated embodiment, the hanger lugs 410 are axially separated from the shoulder 412 by a distance 422 that forms an opening 424 between the hanger lugs 410 and the shoulder 412. In various embodiments, the distance 422 may be substantially equal to or larger than the height 322 of the body lugs 316, thereby facilitating arrangement of the body lugs 316 within the opening 424. In the illustrated embodiment, the opening 424 includes a length 426 that extends radially outward from the axis 418, with respect to the hanger lugs 410. In various embodiments, a diameter 428 of the opening 424 may be substantially equal to a diameter 430 of the bore 402.

In various embodiments, the shoulder 412 includes a length 432 that extends radially inward toward the axis 418. In the embodiment illustrated in FIG. 4, the length 432 is substantially equal to the length 416. However, it should be appreciated that in other embodiments the length 432 may be larger than the length 416. In various embodiments, the shoulder 412 extends continuously about the circumference 414, and as a result, may support the body lugs 316 regardless of their position within the opening 424. That is, the shoulder 412 may support the body lugs 316 as they are rotated about the axis 418 to align with the hanger lugs 410 and block axial movement of the valve 300. Furthermore, in various embodiments, the shoulder 412 may block additional downward movement of the valve 300. For example, the shoulder 412 may be arranged at a predetermined position to align the seal 328 with a sealing surface of the tubing hanger 400.

Figure 5:
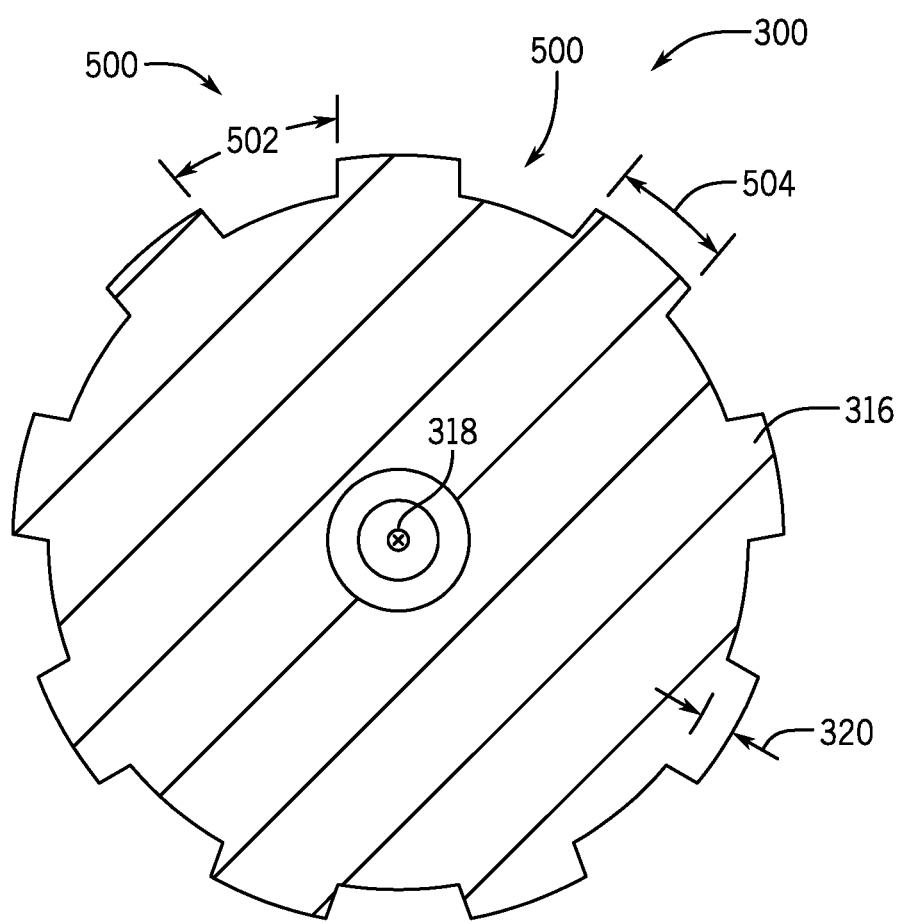
FIG. 5 is a top plan cross-sectional view of an embodiment of a unidirectional valve having body lugs, in accordance with embodiments of the present disclosure.

FIG. 5 is a cross-sectional top plan view of an embodiment of the valve 300. In the illustrated embodiment, the body lugs 316 are illustrated extending radially outward from the axis 318, for example by the length 320. As described above, spaces 500 are arranged between the plurality of body lugs 316. The spaces have a width 502, which may correspond to a width between the hanger lugs 410, as will be described below, to enable the body lugs 316 to pass axially through the spaces between the hanger lugs 410. Moreover, in the illustrated embodiment, the body lugs 316 have a width 504. It should be appreciated that, in various embodiments, the width 504 may be substantially equal to the width 502. However, the width 504 may be larger than or smaller than the width 502. Moreover, the respective widths 504 of the body lugs 316 may not be equal, with certain lugs being larger than other lugs. Similarly, the width 502 of the spaces 500 may not be equal. In this manner, certain engagement positions may be predetermined.

In the embodiment illustrated in FIG. 5, the body lugs 316 are arranged equally about the circumference 324. However, it should be appreciated that the body lugs 316 may not be equally arranged about the circumference 324, with more or fewer body lugs 316 being arranged at various locations. Furthermore, while the illustrated valve 300 includes nine body lugs 316, any number of body lugs may be included as particularly selected for wellbore operations. For example, there may be 1, 2, 3, 4, 5, 6, 7, 8, 9, 10, or any other number of body lugs.

Figure 6:
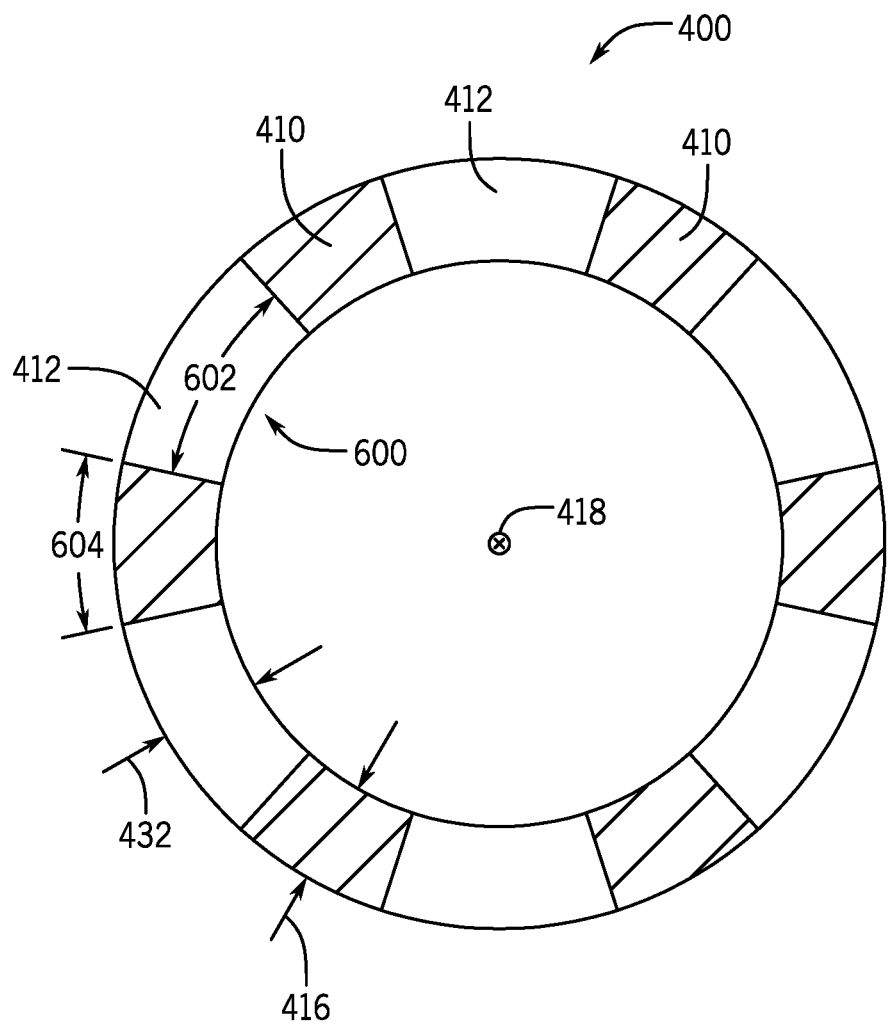
FIG. 6 is a top plan cross-sectional view of an embodiment of a tubing hanger having hanger lugs, in accordance with embodiments of the present disclosure.

FIG. 6 is a cross-sectional top plan view of an embodiment of the tubing hanger 400. In the illustrated embodiment, the hanger lugs 410 are illustrated extending radially inward toward the axis 418, for example by the length 416. As describe above, in various embodiments gaps 600 are arranged between the plurality of hanger lugs 410. The gaps 600 have a width 602, which may correspond to the width 504 of the body lugs 316, thereby enabling axial passage through the gaps 600. Moreover, in the illustrated embodiment, the hanger lugs 410 have a width 604. It should be appreciated that, in various embodiments, the width 604 may be substantially equal to the width 602. However, the width 604 may be larger than or smaller than the width 602. Moreover, the respective widths 604 of the hanger lugs may not be equal, with certain lugs being larger than other lugs. Similarly, the width 602 of the gaps 600 may not be equal. In this manner, certain engagement positions may be predetermined, as noted with respect to the spaces 500.

In the embodiment illustrated in FIG. 6, the hanger lugs 410 are arranged equally about the circumference 414. However, it should be appreciated that the hanger lugs 410 may not be equally arranged about the circumference 414, with more or fewer hanger lugs 410 being arranged at various locations. Furthermore, while the illustrated tubing hanger 400 includes six hanger lugs 410, any number of hanger lugs may be included as particularly selected for wellbore operations. For example, there may be 1, 2, 3, 4, 5, 6, 7, 8, 9, 10, or any other number of body lugs. As illustrated, the shoulder 412 is visible through the gaps 600. In the illustrated embodiment, the shoulder 412 extends continuously about the circumference 414 and extends the length 432, which is substantially equal to the length 416 in the illustrated embodiment. In operation, the body lugs 316 will pass through the gaps 600 and will rest on the shoulder 412. Thereafter, the valve 300 may be rotated such that the body lugs 316 align with the hanger lugs 410, thereby blocking axial movement of the valve 300.

Figure 7A:
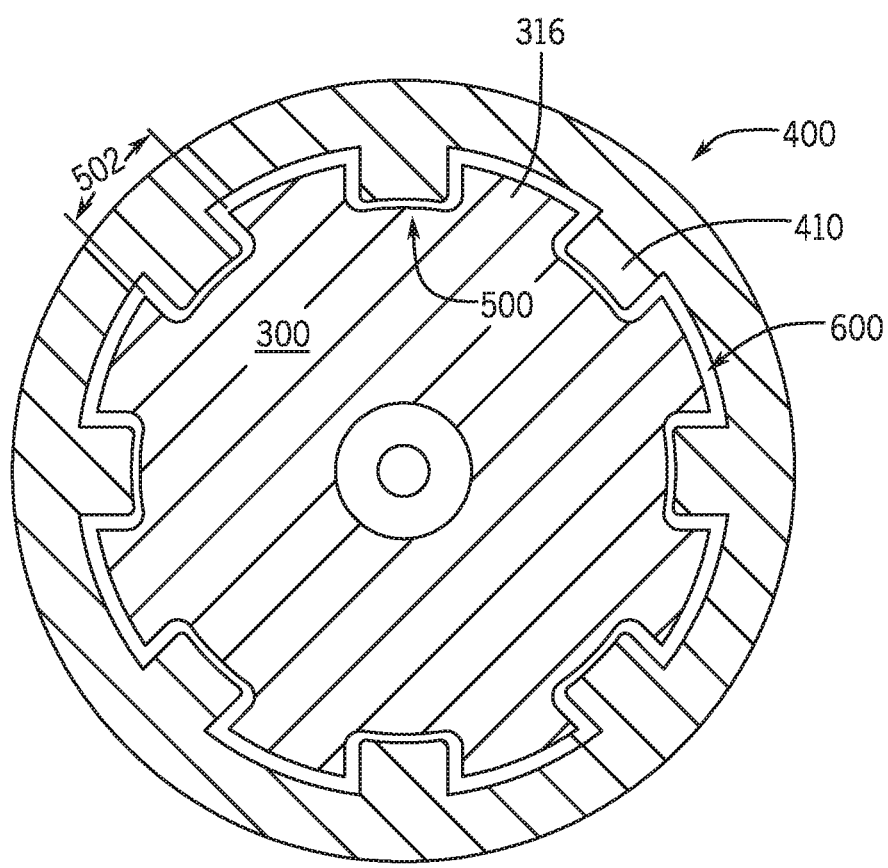
FIG. 7A is a top plan cross-sectional view of an embodiment of a unidirectional valve arranged within a tubing hanger, in accordance with embodiments of the present disclosure.

FIG. 7A is a cross-sectional plan view of an embodiment of the valve 300 arranged within the bore 402 of the tubing hanger 400. It should be appreciated that certain features have been removed for clarity with the following discussion. For example, the shoulder 412 has been removed to illustrate the position of the body lugs 316 with respect to the hanger lugs 410. In the illustrated embodiment, the body lugs 316 are axially aligned with the gaps 600 and the hanger lugs 310 are axially aligned with the spaces 500. As a result, axial movement of the valve 300 relative to the tubing hanger 400 is enabled, which provides a path for movement of the body lugs 316 into the opening 232 (FIG. 2), 424 (FIG. 4).

Figure 7B:
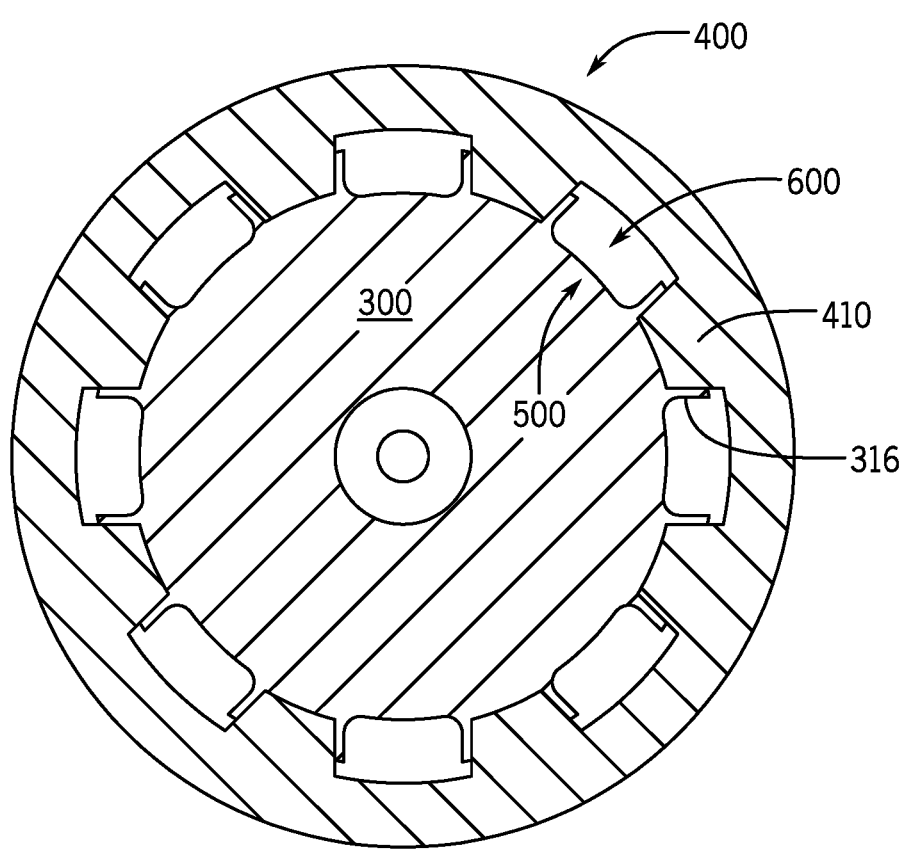
FIG. 7B is a top plan cross-sectional view of an embodiment of a unidirectional vale arranged within a tubing hanger, in accordance with embodiments of the present disclosure.

FIG. 7B is a cross-sectional plan view of an embodiment of the valve 300 axially restricted by the tubing hanger 400. In the illustrated embodiment, the valve 300 has been rotated such that the body lugs 316 are aligned with the hanger lugs 410. In various embodiments, the rotation is less than one full rotation of the valve 300. For example, the rotation can be approximately 10 degrees, approximately 20 degrees, approximately 30 degrees, approximately 40 degrees, approximately 50 degrees, approximately 60 degrees, approximately 70 degrees, approximately 80 degrees, approximately 90 degrees, approximately 100 degrees, approximately 110 degrees, approximately 120 degrees, approximately 130 degrees, approximately 140 degrees, approximately 150 degrees, approximately 160 degrees, approximately 170 degrees, approximately 180 degrees, approximately 190 degrees, approximately 200 degrees, approximately 210 degrees, approximately 220 degrees, approximately 230 degrees, approximately 240 degrees, approximately 250 degrees, approximately 260 degrees, approximately 270 degrees, approximately 280 degrees, approximately 290 degrees, approximately 300 degrees, approximately 310 degrees, approximately 320 degrees, approximately 330 degrees, approximately 340 degrees, approximately 350 degrees, or any other reasonable rotational amount. Moreover, the gaps 600 and spaces 500 are aligned. As a result, axial movement of the valve 300 is blocked via contact between the body lugs 316 and the hanger lugs 410.

It should be appreciated that while the embodiments illustrated in FIGS. 7A and 7B include an equal number of body lugs 316 and hanger lugs 410, that in other embodiments that may not be an equal number. For example, there may be more hanger lugs 410 than body lugs 316. Furthermore, while the illustrated embodiment includes eight body lugs 316 and eight hanger lugs 410, any other reasonable number of lugs 316, 410 may be included.

Figure 8:
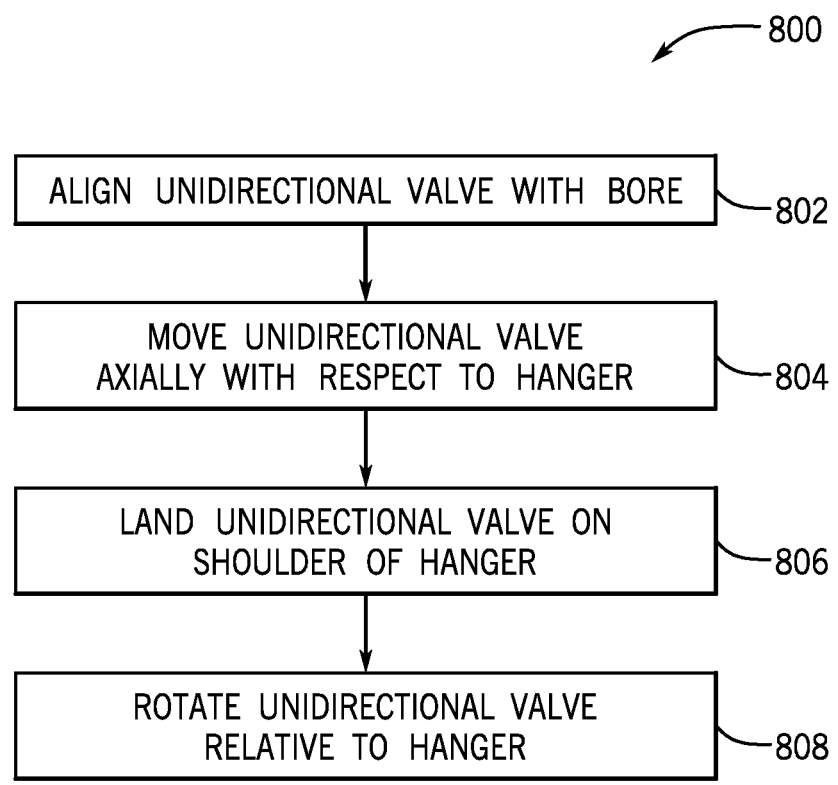
FIG. 8 is a flow chart of an embodiment of a method for securing a unidirectional valve to a tubing hanger, in accordance with embodiments of the present disclosure.

FIG. 8 is a flow chart of an embodiment of a method 800 for installing a unidirectional valve, such as the unidirectional valve 300, into a hanger, such as the tubing hanger 400. However, as noted above, it should be appreciated that the hanger may be replaced with a wellhead or any other wellbore component. For this method, and all methods discussed herein, it should be appreciated that there may be more or fewer steps, and the steps may be performed in any order, or in parallel, unless otherwise specifically stated. In this example, the unidirectional valve is aligned with a bore, such as a bore of a tubing hanger (block 802). For example, the valve 300 may be aligned with the bore 402. In various embodiments, alignment also includes aligning the body lugs 316 of the valve 300 with the gaps 600 of the tubing hanger. The valve is moved axially with respect to the hanger (block 804). For example, the valve 300 may be moved along the axis 318 such that the body lugs 316 move past the hanger lugs 410, through the gaps 600, and into the opening 424. Movement of the valve may enable landing the valve onto a shoulder of the hanger (block 806). In various embodiments, the axial movement of the valve 300 may cause the body lugs 316 to engage the shoulder 412, thereby blocking further axial movement of the valve 300. The valve may then be rotated relative to the hanger (block 808). Rotation of the valve 300 may be sufficient to align the body lugs 316 and the hanger lugs 410 such that axial movement of the valve 300 is blocked. For example, an upward force on the valve 300 would drive the body lugs 316 into the hanger lugs 410, thereby blocking movement. In this manner, the valve 300 may be secured to the hanger 400 without threading the valve 300 to the hanger 400. In other words, the valve 300 may be secured to the hanger 400 with less than a full rotation of the valve 300.

Although the technology herein has been described with reference to particular embodiments, it is to be understood that these embodiments are merely illustrative of the principles and applications of the present technology. It is therefore to be understood that numerous modifications may be made to the illustrative embodiments and that other arrangements may be devised without departing from the spirit and scope of the present technology as defined by the appended claims.

The invention claimed is:

1. A wellbore pressure control system, comprising:
a tubing hanger having a bore extending from a first end to a second end, the tubing hanger comprising:
a hanger lug extending radially inward from a wall of the bore toward an axis, the hanger lug having an angled surface on a top of the hanger lug;
a shoulder axially lower than the hanger lug, the shoulder extending radially inward from the wall of the bore toward the axis; and
an opening between the hanger lug and the shoulder; and
a unidirectional valve arranged within the bore of the tubing hanger and non-threadingly coupled to the tubing hanger, the unidirectional valve comprising:
a valve assembly blocking flow in a first direction and enabling flow in a second direction; and
a body lug extending radially outward from a body of the unidirectional valve, the body lug positioned within the opening such that the body lug is axially aligned with the hanger lug to restrict axial movement of the unidirectional valve relative to the tubing hanger, the body lug having a body lug axial height less than an opening axial height such that an interaction location of a seal, associated with the unidirectional valve, with a sealing surface along the bore changes based on whether pressure is applied axially below the unidirectional valve or axially above the unidirectional valve.

2. The system of claim 1, further comprising:
a plurality of hanger lugs, the plurality of hanger lugs arranged circumferentially about the bore; and
a plurality of body lugs, the plurality of body lugs arranged circumferentially about the unidirectional valve.

3. The system of claim 2, further comprising:
a space between each body lug of the plurality of body lugs, the space separating a first body lug from an adjacent body lug; and
a gap between each hanger lug of the plurality of hanger lugs, the gap separating a first hanger lug from an adjacent hanger lug.

4. The system of claim 1, further comprising:
a slanted lower edge of the unidirectional valve, wherein the slanted lower edge directs the unidirectional valve toward the bore.

5. The system of claim 4, wherein the angled surface interacts with the slanted lower edge as the unidirectional valve is lowered into the bore.

6. The system of claim 1, wherein a length of the hanger lug is substantially equal to a length of the body lug.

7. The system of claim 1, wherein the shoulder is continuous about a circumference of the bore.

8. The system of claim 1, wherein the seal is arranged on the body axially lower than the body lug.

9. A system for coupling objects in a wellbore, the system comprising:
a unidirectional valve having a body, the body including two or more body lugs extending radially outward, each body lug of the two or more body lugs extending at least a portion of a circumferential distance of the body; and
a tubing hanger installed within a wellbore, the tubing hanger having an inner diameter greater than a maximum outer diameter of the unidirectional valve and a bore that receives the unidirectional valve, the bore including a bi-directional axial restraint system that receives the two or more body lugs and blocks axial movement of the unidirectional valve in a first position, via interference between the two or more body lugs and the bi-directional axial restraint system, and enables axial movement of the unidirectional valve in a second position, the unidirectional valve being non-threadingly coupled to the tubing hanger, wherein the two or more body lugs have respective body lug axial heights less than an opening axial height corresponding to an opening of the bi-directional axial restraint system that receives the two or more body lugs, the two or more body lugs being movable within the opening responsive to whether pressure is applied axially below the unidirectional valve or axially above the unidirectional valve, and movement of the unidirectional valve adjusting a sealing location of a seal along a sealing surface of the bore.

10. The system of claim 9, wherein the axial restraint system comprises:
   two or more hanger lugs extending radially into the bore, the hanger lugs being separated by a gap sized to enable at least one of the two or more body lugs to axially pass through the gap;
   a shoulder axially lower than the two or more hanger lugs, the shoulder extending radially into the bore; and
   the opening between the two or more hanger lugs and the shoulder, the opening receiving the two or more body lugs when the unidirectional valve is non-threadingly coupled to the tubing hanger.

11. The system of claim 10, the gap has a first width and a respective second width of the two or more body lugs is smaller than the first width to enable the two or more body lugs to axially pass through the gap.

12. The system of claim 10, wherein the shoulder blocks downward axial movement of the unidirectional valve beyond a predetermined point, the shoulder extending continuously about a circumference of the bore.

13. The system of claim 10, wherein at least one hanger lug of the two or more hanger lugs is aligned with at least one body lug of the two or more hanger lugs in the first position.

14. The system of claim 9, wherein the two or more body lugs are axially lowered into the axial restraint system.

15. The system of claim 9, wherein the seal is arranged on the body axially lower than the body lug.

16. A method for installing a valve into a tubing hanger, the method comprising:
   aligning the valve with a bore of the tubing hanger;
   axially moving the valve through the bore;
   landing at least a portion of the valve on a shoulder extending radially inward from the bore and arranged axially lower than at least two hanger lugs extending radially inward;
   rotating the valve less than one full rotation;
   engaging, via a seal secured to the valve, a first sealing location along a sealing surface of the bore, the first sealing location selected responsive to a downward axial force applied to the valve; and
   engaging, via the seal, a second sealing location along the seal surface of the bore, the second sealing location selected responsive to an upward axial force applied to the valve.

17. The method of claim 16, wherein aligning the valve with a bore of the tubing hanger further comprises:
   axially aligning a body lug extending radially outward from the valve with a gap between the at least two hanger lugs extending radially inward from the bore.

18. The method of claim 16, wherein axially moving the valve through the bore further comprises:
   moving a body lug extending radially outward from the valve through a gap between at least two hanger lugs extending radially inward from the bore.

19. The method of claim 16, wherein rotating the valve less than one full rotation comprises:
   rotating the valve to axially align a body lug extending radially outward from the valve with a hanger lug extending radially inward from the bore.

* * * * *